(12) United States Patent
Dragt

(10) Patent No.: US 10,121,134 B2
(45) Date of Patent: *Nov. 6, 2018

(54) PAYMENT TERMINAL MESSAGING

(71) Applicant: First Data Corporation, Greenwood Village, CO (US)

(72) Inventor: Bruce Dragt, Marietta, GA (US)

(73) Assignee: First Data Corporation, Greenwood Village, CO (US)

( * ) Notice: Subject to any disclaimer, the term of this patent is extended or adjusted under 35 U.S.C. 154(b) by 504 days.

This patent is subject to a terminal disclaimer.

(21) Appl. No.: 14/757,932

(22) Filed: Dec. 24, 2015

(65) Prior Publication Data

US 2016/0171470 A1    Jun. 16, 2016

Related U.S. Application Data

(63) Continuation of application No. 12/644,150, filed on Dec. 22, 2009, now Pat. No. 9,224,139.

(51) Int. Cl.

| | |
|---|---|
| *G06Q 20/20* | (2012.01) |
| *G06Q 20/32* | (2012.01) |
| *G06Q 30/06* | (2012.01) |
| *G07G 1/01* | (2006.01) |
| *G07G 1/14* | (2006.01) |
| *H04L 12/58* | (2006.01) |

(52) U.S. Cl.
CPC .......... *G06Q 20/202* (2013.01); *G06Q 20/20* (2013.01); *G06Q 20/204* (2013.01); *G06Q 20/32* (2013.01); *G06Q 20/3221* (2013.01); *G06Q 20/3255* (2013.01); *G06Q 30/0603* (2013.01); *G07G 1/01* (2013.01); *G07G 1/14* (2013.01); *H04L 51/14* (2013.01)

(58) Field of Classification Search
None
See application file for complete search history.

(56) References Cited

U.S. PATENT DOCUMENTS

| | | | |
|---|---|---|---|
| 5,473,143 A | 12/1995 | Vak et al. | |
| 5,696,909 A | 12/1997 | Wallner | |
| 7,600,676 B1 | 10/2009 | Rados et al. | |
| 9,244,139 B2 | 1/2016 | Brown et al. | |
| 2002/0082896 A1* | 6/2002 | Inagi | G06Q 10/06 705/7.18 |
| 2008/0255929 A1 | 10/2008 | Mouton | |
| 2011/0153438 A1 | 6/2011 | Dragt | |

* cited by examiner

*Primary Examiner* — Paul Danneman
(74) *Attorney, Agent, or Firm* — Kilpatrick Townsend & Stockton LLP

(57) ABSTRACT

A payment terminal and a host computer system are configured to provide human-readable messaging capability with a person at an external location outside of a financial infrastructure. A payment terminal at a point of sale may be used to cause human-readable message content to be forwarded to the person by the host computer system, either automatically or at the instigation of an operator of the payment terminal. Message content from the person may be delivered to the payment terminal for display to the operator. The person at the external location may be able to retrieve information stored in the payment terminal via standard communication channels. The system also provides a mechanism for exchanging messages between payment terminals.

19 Claims, 11 Drawing Sheets

203 — PLEASE USE KEYPAD TO ENTER THE FOLLOWING:

DESTINATION: 555-555-5555

MESSAGE: PLEASE SEND MORE SYRUP FOR THE SODA MACHINE

WHEN MESSAGE COMPLETE, PRESS ENTER TO SEND

204

| QZ, 1 | ABC 2 | DEF 3 | CLR X |
| --- | --- | --- | --- |
| GHI 4 | JKL 5 | MNO 6 | BACKSP |
| PRS 7 | TUV 8 | WXY 9 | ALPHA |
| ←-SP\ | *#. 0 | @:/→ | ENTER |

FIG. 4A

203 — PLEASE USE KEYPAD TO ENTER THE FOLLOWING:

DESTINATION: T3 555-555-5555

MESSAGE: COLD DAY TODAY. MOVED ICE SCRAPERS AND STOCKING CAPS NEXT TO REGISTER. SELLING LIKE HOTCAKES.

WHEN MESSAGE COMPLETE, PRESS ENTER TO SEND

204

| QZ, 1 | ABC 2 | DEF 3 | CLR X |
| GHI 4 | JKL 5 | MNO 6 | BACKSP |
| PRS 7 | TUV 8 | WXY 9 | ALPHA |
| ←-SP\ | *#. 0 | @:/→ | ENTER |

FIG. 4B

203 — INCOMING MESSAGE RECEIVED:

FROM: 16 TH STREET STORE FRONT REGISTER

MESSAGE: COLD DAY TODAY. MOVED ICE SCRAPERS AND STOCKING CAPS NEXT TO REGISTER. SELLING LIKE HOTCAKES.

PRESS BACKSP TO REPLY

204

| QZ, 1 | ABC 2 | DEF 3 | CLR X |
| --- | --- | --- | --- |
| GHI 4 | JKL 5 | MNO 6 | BACKSP |
| PRS 7 | TUV 8 | WXY 9 | ALPHA |
| ←-SP\ | *#. 0 | @:/→ | ENTER |

PAYMENT TERMINAL MESSAGING MAIN PAGE

User John Q. Manager is Logged In | LOGOUT | MANAGE ACCOUNTS

Select action: ☐ Send message ☒ Request data

Select payment terminal to receive message or request
- ○ 16th Street store, front register
- ● 16th Street store, back register
- ○ Airport kiosk Select data to retrieve
- ○ Last transaction amount
- ● Day's total transactions
- ● Time of first transaction today Select destination(s) for returned information
- ● Display on this page
- ● Text to 555-555-5555
- ○ Email to homeoffice@ispname.com

801
SUBMIT

Message to send to payment terminal

Data received or returned from payment terminal

2:45 PM 12/7/2009: Term 2 day tot = $923.46 : 1st transaction 8:14AM

FIG. 8

PAYMENT TERMINAL MESSAGING

CROSS-REFERENCE TO RELATED APPLICATIONS

This application claims the benefit of priority to and is a continuation of U.S. patent application Ser. No. 12/644,150, filed Dec. 22, 2009, the contents of which are incorporated herein by reference in its entirety.

BACKGROUND OF THE INVENTION

A business owner or manager may wish to stay informed about events occurring in one or more retail locations, and especially may wish to receive frequent updates about the financial performance of a particular retail location, even when the owner or manager is away from the retail location. Existing communication mechanisms may not be convenient, and may lack the capability of providing detailed financial information.

BRIEF SUMMARY OF THE INVENTION

In some embodiment, a method of providing human-readable information from a payment terminal to a person outside a financial infrastructure comprises receiving, by a host computer system, from the payment terminal, over a first communication channel, a first electronic message including message content and an indication that the message content is to be forwarded in human-readable form. The method further comprises obtaining, by the host computer system, an indication of an external destination to which the message content is to be forwarded; generating, by the host computer system, a second electronic message including the message content for presentation in a human-readable form compatible with the indicated destination; and forwarding, by the host computer system, the second electronic message, including the message content, to the indicated destination over a second communication channel via an external interface included in the host computer system. In some embodiments, forwarding the second electronic message comprises sending a short message service message including the message content. In some embodiments, forwarding the second electronic message comprises sending an electronic mail message including the message content. In some embodiments, forwarding the second electronic message comprises serving a web page containing the message content. The first communication channel may also carry transaction approval requests from the payment terminal to the host computer system.

In other embodiments, a host computer system comprises a processor, a memory, and interfaces to first and second communication channels, and the memory contains instructions that when executed by the processor cause the host computer system to receive, from a payment terminal, over the first communication channel, a first electronic message including message content; obtain an indication of an external destination outside of a financial infrastructure to which the message content is to be forwarded; generate a second electronic message including the message content for presentation in a human-readable form compatible with the indicated destination; and forward the second message, including the message content, to the indicated destination over the second communication channel. In some embodiments, the instructions, when executed by the processor, further cause the host computer system to send, as the second electronic message, a short message service message including the message content. In some embodiments, the instructions, when executed by the processor, further cause the host computer system to send, as the second electronic message, an electronic mail message including the message content. In some embodiments, the instructions, when executed by the processor, further cause the host computer system to serve a web page containing the message content.

In other embodiments, a method of communicating information to a payment terminal comprises receiving, by a host computer system via a first communication channel, from a person at a source outside a financial infrastructure, a first electronic message that includes message content to be delivered in a human-readable form at the payment terminal. The method further comprises obtaining, by the host computer system, an identification of the payment terminal to which the message content is to be forwarded; generating, by the host computer system, a second electronic message including the message content; and forwarding, by the host computer system, the second electronic message to the identified payment terminal over a second communication channel. In some embodiments, the first electronic message is a short message service message. In some embodiments, the first electronic message is an electronic mail message. In some embodiments, the method further comprises holding the message content in a memory of the host computer system until the payment terminal initiates contact with the host computer system, and then forwarding the second electronic message to the payment terminal. The second communication channel may also carry transaction approval requests from the payment terminal to the host computer system. In some embodiments, the first electronic message requests information from the payment terminal, and the method further comprises receiving, by the host computer system, from the payment terminal over the second communication channel, a return message including the requested information, and forwarding, by the host computer system, the information to the external source over the first communication channel. In some embodiments, the information includes one or more items selected from the following list of items: a number of transactions performed using the payment terminal in a certain time period; a total monetary amount of transactions performed using the payment terminal in a certain time period; an average monetary amount of transactions performed using the payment terminal in a certain time period; a monetary amount of the most recent transaction performed using the payment terminal; a status of the payment terminal; and an indication of an amount of a consumable supply item consumed by or remaining in the payment terminal. Forwarding the information to the external source may comprise including the information in a short message service message. Forwarding the information to the external source may comprise including the information in an electronic mail message. Forwarding the information to the external source may comprise including the information in a web page served by the host computer system.

In some embodiments, a host computer system comprises a processor, a memory, and interfaces to first and second communication channels, and the memory contains instructions that when executed by the processor cause the host computer system to receive via the first communication channel, from a person at a source outside a financial infrastructure, a first electronic message that includes message content; obtain an identification of a payment terminal at which the message content is to be delivered in a human-readable form; generate a second electronic message including the message content; and forward the second electronic message to the identified payment terminal over the second communication channel. In some embodiments, the instructions, when executed by the processor, further cause the host computer system to hold the message content in the memory until the payment terminal initiates contact with the host computer system, and then forward the second electronic message to the payment terminal. In some embodiments, the first electronic message requests information from the payment terminal, and the instructions, when executed by the processor, further cause the host computer system to receive, from the payment terminal over the second communication channel, a return message including the requested information, and forward the information to the external source over the first communication channel. In some embodiments, the instructions, when executed by the processor, further cause the host computer system to forward the information to the external source in a short message service message. In some embodiments, the instructions, when executed by the processor, further cause the host computer system to forward the information to the external source in an electronic mail message. In some embodiments, the instructions, when executed by the processor, further cause the host computer system to forward the information to the external source in a web page served by the host computer system.

In some embodiments, a system comprises a host computer system including a first processor, a first memory, and interfaces to first and second communication channels; and a computerized payment terminal including a second processor, a second memory, and an interface to the second communication channel. Each of the host computer system and the computerized payment terminal includes instructions stored in its respective memory and executable by its respective processor, the instructions collectively configuring the host computer system and the computerized payment terminal to cooperate to receive, by the host computer system via the first communication channel, from a person at a source outside a financial infrastructure, a first electronic message that includes first message content to be forwarded to the payment terminal; obtain, by the host computer system, an identification of the payment terminal; generate, by the host computer system, a second electronic message including the message content; forward, by the host computer system, the second electronic message from the host computer system to the identified payment terminal over the second communication channel; transmit, by the payment terminal, a third electronic message including second message content from the payment terminal to the host computer system via the second communication channel; generate, by the host computer system, a fourth electronic message including the message content for presentation in a human-readable form compatible with the source; and forward, by the host computer system, the fourth message, including the second message content, from the host computer system to the source over the second communication channel. In some embodiments, the third electronic message is transmitted in response to the second electronic message. In some embodiments, the second electronic message requests information from the payment terminal, and the instructions in the second memory when executed by the second processor cause the payment terminal to include the requested information in the third electronic message. In some embodiments, the instructions in the second memory when executed by the second processor further cause the payment terminal to retrieve transaction information stored in the payment terminal and to include the transaction information in the third electronic message.

In some embodiments, a method of providing human-readable information from a computerized payment terminal to a person outside a financial infrastructure comprises generating, using a processor included in the payment terminal, an electronic message that includes message content and an indication that the message content is to be forwarded in human-readable form to a destination outside of a financial infrastructure; and sending, by the payment terminal, the electronic message to a host computer system via a communication channel for forwarding of the message content to the destination. In some embodiments, the method further comprises receiving, using an input device, information from an operator of the payment terminal; and including, by the payment terminal, the received information in the message content. In some embodiments, the method further comprises generating the electronic message automatically using the processor. In some embodiments, the method further comprises including in the message content information stored in a memory of the payment terminal.

In some embodiments, a payment terminal comprises a processor, a memory, and an interface to a communication channel. The memory contains instructions that when executed by the processor cause the payment terminal to generate an electronic message that includes message content and an indication that the message content is to be forwarded in human-readable form to a destination outside of a financial infrastructure; and send the electronic message to a host computer system via the communication channel for forwarding of the message content to the destination. In some embodiments, the payment terminal further comprises an input device for receiving information from an operator of the payment terminal, and the instructions further cause the payment terminal to include the received information in the message content. The input device may be a keypad integral with the payment terminal. The input device may be a touchscreen integral with the payment terminal. The input device may be a peripheral device to the payment terminal. The instructions may further cause the payment terminal to generate and send the electronic message automatically. The instructions may further cause the payment terminal to generate and send the electronic message at the instigation of an operator of the payment terminal. The instructions may further cause the payment terminal to include in the message content information stored in the memory.

In some embodiments, a method of forwarding a message from a first payment terminal to a second payment terminal comprises receiving, by a host computer system, from the first payment terminal, over a first communication channel, a first electronic message including message content and an indication that the message content is to be forwarded to a second payment terminal; obtaining, by the host computer system, an identification of the second payment terminal to which the message content is to be forwarded; generating, by the host computer system, a second electronic message including the message content in a form compatible with the second payment terminal; and forwarding, by the host computer system, the second electronic message, including the message content, to the second payment terminal over a second communication channel to be displayed on the second payment terminal.

In some embodiments, a host computer system comprises a processor, a memory, and interfaces to first and second communication channels, and the memory contains instructions that when executed by the processor cause the host computer system to receive, from a first payment terminal, over the first communication channel, a first electronic message including message content; obtain an identification of a second payment terminal to which the message content is to be forwarded; generate a second electronic message including the message content in a form compatible with the second payment terminal; and forward the second message, including the message content, to the second payment terminal over the second communication channel.

BRIEF DESCRIPTION OF THE DRAWINGS

FIG. 4A illustrates a user interface screen to be displayed on a display of a payment terminal, in accordance with embodiments of the invention.

FIG. 4B illustrates another user interface screen to be displayed on a display of a payment terminal, in accordance with embodiments of the invention.

FIG. 4C illustrates another user interface screen to be displayed on a display of a payment terminal, in accordance with embodiments of the invention.

FIG. 8 shows a web page interface, in accordance with embodiments of the invention.

DETAILED DESCRIPTION OF THE INVENTION

Embodiments of the present invention are directed to systems and methods for providing communications between a person outside of a financial infrastructure and a payment terminal at a retail location. These systems and methods may enable a person such as a business owner or manager to exchange messages with the payment terminal using standard messaging tools, even when the person is not at the retail location. For example, a store employee may key a message into the payment terminal and cause the message to be sent to the business owner in a short message service (SMS) message or an electronic mail message. In another example, a business owner may be able to retrieve transaction information from the payment terminal using a standard web browser on a personal computer or other device.

Figure 1:
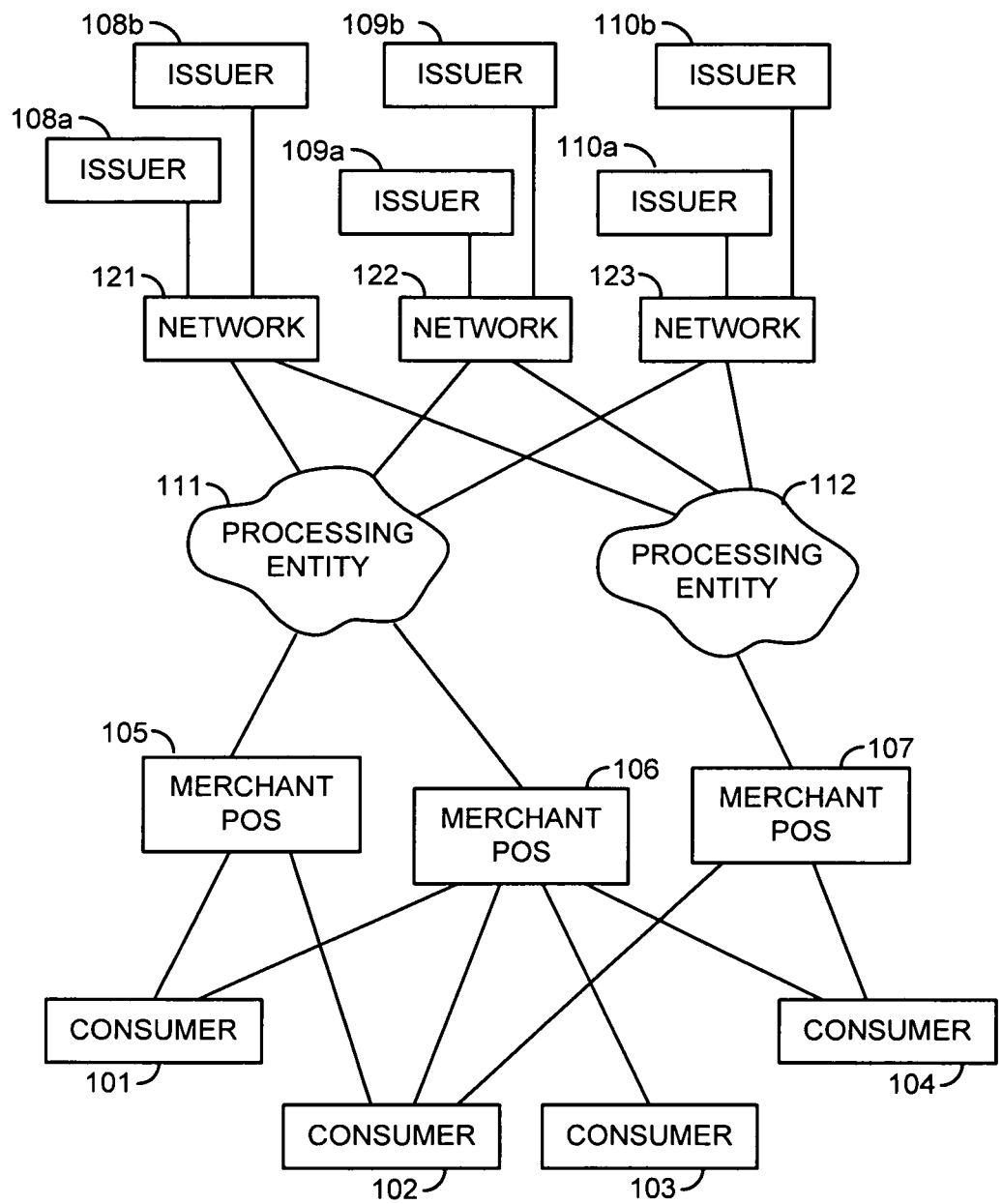
FIG. 1 illustrates a simplified diagram of a portion of a financial infrastructure.

FIG. 1 illustrates a simplified diagram of a portion of a financial infrastructure. In this example, each of consumers 101-104 may wish to make purchases at merchants 105-107 using presentation instruments such as credit cards and debit cards issued by issuers 108a-110b. The diagram of FIG. 1 is simplified, in that in practice there may be many thousands of card issuers, millions of merchants, and hundreds of millions or even billions of consumers in the marketplace. Each merchant 105-107 wishes to accept a wide variety of cards, in order to accommodate many different consumers. But given the large numbers of merchants and issuers, it is impractical for each merchant to establish a working relationship with each issuer and to maintain equipment to interact with each issuer individually. To simplify the process of accepting presentation instruments, most merchants establish a relationship with a processing entity such as entity 111 or 112.

During a typical purchase transaction, the merchant "swipes" a consumer's card into a payment terminal, also sometimes called a point of sale device or POS device. The payment terminal contacts a processing entity such as processing entity 111, and sends a transaction approval request message that includes the consumer's card number and the amount of the proposed purchase, among other information items. The processing entity determines, based on the card number, which "network" 121, 122, 123 the card is affiliated with, and forwards the approval request to the appropriate network. In this context, a "network" describes a company and an affiliated group of issuers that offer payment instruments branded as affiliated with the network, along with the necessary agreements and hardware infrastructure for administering the network. Examples of networks include the Visa™, MasterCard™, and American Express™ networks. The network determines which of its affiliated issuers holds the account the consumer wishes to use for payment, and forwards the approval request to the appropriate issuer, for example issuer 108a. The issuer determines whether the consumer has enough available credit (or enough funds on deposit for a debit transaction), and if so, sends an approval message back to the network, which forwards it to the processing entity, which then forwards the approval message to the payment terminal.

Figure 2:
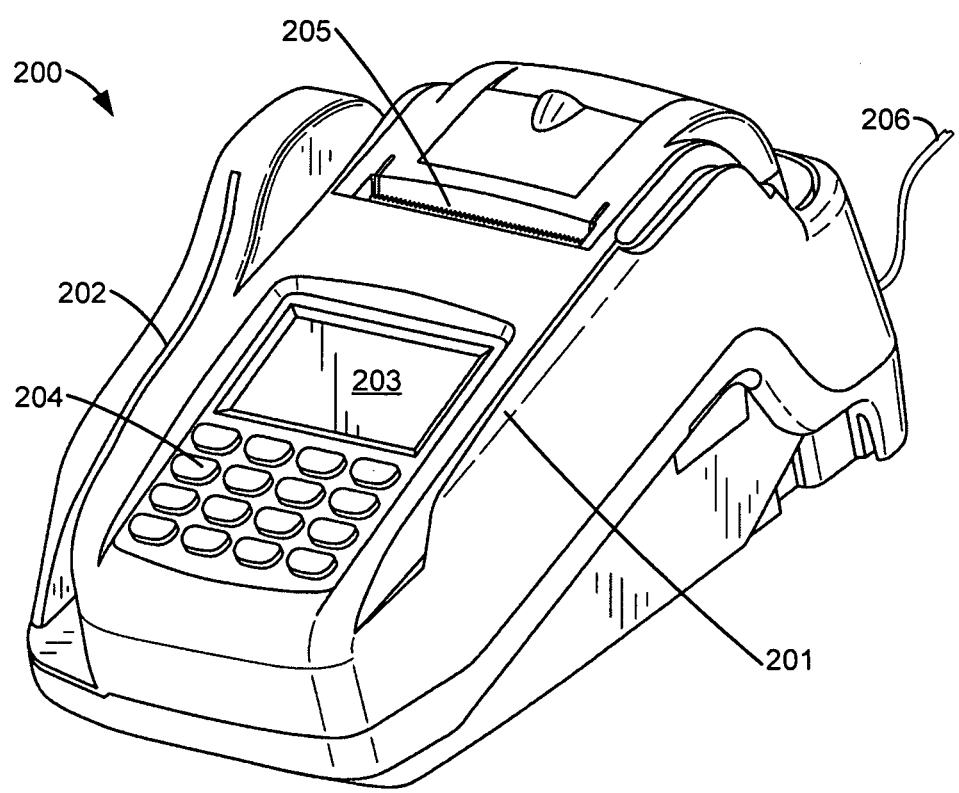
FIG. 2 illustrates a payment terminal, in accordance with embodiments of the invention.

FIG. 2 illustrates a payment terminal 200, in accordance with embodiments of the invention. Example payment terminal 200 is of a kind that may be used by a small business. Payment terminal 201 may include features such as a card slot 201 and associated reader for reading magnetically encoded information from credit cards, debit cards, and the like, a check slot 202 and an associated reader for reading information from paper checks, a display 203, a keypad 204, and a printer 205. Display 203 may be used for displaying approval or denial results, and printer 205 may be used for printing charge slips to be signed by the consumer. Keypad 204 may be used for keying in information not successfully read from a consumer's card, or other information.

Payment terminal 200 also includes an interface to a communication channel for communicating with other devices, such as a host computer system at a processing entity. In this example, the interface is represented by cable 206. In many payment terminals, the communication channel is a simple telephone connection, although some payment terminals can also connect to computer networks. (In this context, "network" refers to an electronic communication network, and not to a card processing network as described above.) During a transaction, payment terminal 200 may dial a predetermined telephone number to initiate communication with a processing entity, send enough information for an issuer to make a transaction approval decision, wait to receive the decision, and then disconnect the line so as to minimize the cost of telephone network usage.

In addition, payment terminal 200 may also store information about each transaction, for later settlement processing. Preferably during an idle time, such as late at night, payment terminal may contact the processing entity and "batch out" the stored data, for settlement of the accumulated transactions. The "batch out" process may be performed once per day or once per shift for a typical small business.

A business owner or manager is typically not at his or her store location at all times, and therefore may not have firsthand knowledge of events at the store at some times. This is especially true for a business owner or manager who oversees several stores. Store employees may wish to send messages to the owner or manager, and the owner or manager may wish to receive updates about the volume and nature of business being conducted at his or her store or stores.

In accordance with embodiments of the invention, a payment terminal such as payment terminal 200 can be used to send information to a person, for example a store owner or manager, outside the financial infrastructure, using standard communications channels. In some embodiments, the store owner or manager can query information stored in the payment terminal to receive recent information about transactions conducted at the payment terminal.

Figure 3:
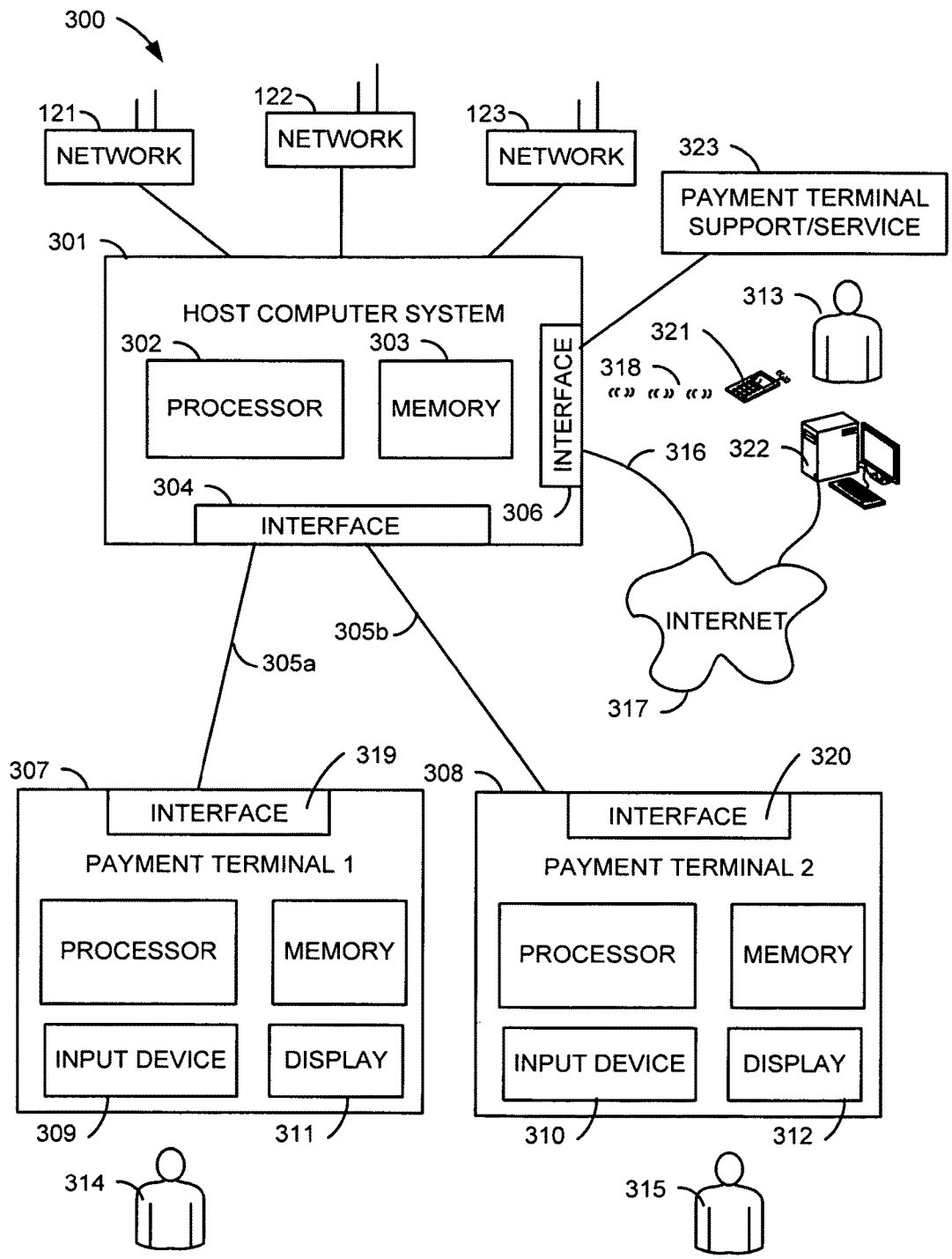
FIG. 3 illustrates a system in accordance with embodiments of the invention.

FIG. 3 illustrates a system 300 in accordance with embodiments of the invention. A host computer system 301 include a processor 302 and a memory 303. The memory may include volatile memory such as random access memory or another kind of volatile memory, nonvolatile memory such as read only memory, magnetic memory, flash memory, optical storage, or another kind of nonvolatile memory, or any of these in any suitable combination. At least some portion of memory 303 holds instructions executable by processor 302, and when the instructions are executed by processor 302, the host computer system is configured to perform steps in accordance with embodiments of the invention. Host computer system 301 may include a single computer or multiple interconnected computers, which may be collocated or widely distributed. It is to be understood that processor 302 may represent multiple processors, whether in a single or multiple computers, and memory 303 may represent many kinds of memory, which may be in a single computer or distributed among multiple computers or storage sites.

Host computer system 301 includes a first interface 304 to communication channels 305a and 305b, and a second interface 306 to at least one other communication channel. Interface 306 may be termed an external interface, as it provides communication outside the financial infrastructure. Communication channels 305a and 305b enable communication with payment terminals such as payment terminals 307 and 308. Second interface 306 provides communication to a second communication channel, which may be, for example, a connection 316 to the Internet 317, a mobile telephone connection 319, or another communication channel. In some embodiments such as the one shown in FIG. 3, host computer system 301 may be operated by a processing entity such as processing entity 111, and may also forward transaction approval requests received from payment terminals 307 and 308 to issuers represented by issuers 108a-110b. In that case, communication channel 305a or 305b may be the same channel through which host computer system 301 receives transaction approval requests from payment terminals 307 and 308, or may be a different channel. For example, the payment terminals may dial a different telephone number to reach host computer system 301 when implementing communications in accordance with embodiments of the invention. Alternatively, host computer system 301 may be operated by a processing entity but may not receive or forward transaction approval requests. In other embodiments, host computer system 301 may be operated by an entity not involved in processing of transactions.

Each of payment terminals 307 and 308 also includes a respective processor and memory, the memory holding instructions that when executed by the processor configure the payment terminal to operate in accordance with embodiments of the invention. As with host computer system, the memory may comprise volatile memory, nonvolatile memory, storage, or any of these in any suitable combination. The memory may also hold accumulated transaction information awaiting batching out. Each payment terminal also preferably includes an input device 309, 310, and a display 311, 312. Each payment terminal 307, 308 includes an interface 319, 320 to communication channel 305a or 305b, for communication with host computer system 301.

Payment terminals 307 and 308 may reside, for example, at two different store locations associated with a person 313, who may be an owner or manager of the two locations. While two payment terminals 307 and 308 are illustrated, embodiments of the invention may be practiced with only one or any practical number of payment terminals. Payment terminals 307 and 308 may be operated by operators 314, 315, who may be, for example, employees of the two stores.

System 300 may be used to provide communications between payment terminals 307 and 308 and person 313 who is outside the financial infrastructure. That is, any equipment being used by person 313 is not involved in the processing of transactions from payment terminals 307 and 308. For example, person 313 may be a business owner at home or on vacation, who wishes to keep in touch with his or her business interests. Host computer system 301 thus provides the link between the "external" world, outside the financial infrastructure, and the payment terminals.

Embodiments of the invention may best be understood in light of the following examples, although it is to be understood that the scenarios describe below are exemplary only, and not limiting.

Operator-initiated Message

In some example embodiments, employee 314 may wish to notify manager or owner 313 of an event at the store where payment terminal 307 is located. For example, employee 314 may wish to inform his or her manager that business is especially brisk, and that more help is needed at the store. Or employee 314 may wish to request that manager or owner 313 arrange for the delivery of more inventory or supplies. Whatever the message information to be communicated, employee 314 can use input device 309 to enter a message into payment terminal 307 for delivery to a destination accessible to person 313, outside the financial infrastructure. For example, input device 309 may be a keypad such as keypad 204, having a layout similar to a telephone keypad. Employee 314 may use the keypad to key in message content in a manner similar to entering a short message service (SMS) or text message commonly used for communicating between mobile telephones. Even though payment terminal 307 is most likely not directly connected to a wireless telephone network, terminal 307 and host computer system 301 can be programmed to emulate a mobile-to-mobile SMS capability, with text messages being entered into payment terminal 307 and ultimately delivered to mobile phone 321. Alternatively, input device 309 could be a keyboard that is connected as a peripheral to payment terminal 307, and employee 314 could type the message content. Or input device 309 could be a touchscreen interface integrated with display 311 and displaying a keypad or keyboard, and employee 314 could enter the message content using the displayed keypad or keyboard. Once the message content is entered and the employee indicates that a message is to be sent, payment terminal 307 constructs an electronic message that includes the message content and an indication that the message content is to be forwarded in human-readable form to the destination, and the electronic message is sent to host computer 301 over communication channel 305*a*.

For the purposes of this disclosure, a human-readable form means a form that a typical person of ordinary skill can read without requiring any decoding, translation, or other steps. Examples of human-readable forms include plain text, ASCII characters, and the like. Examples of non-human-readable forms include encoded or encrypted information, numbers in binary formats such as an IEEE floating point format, and the like. Content to be forwarded in human-readable form or for presentation in a human-readable form need not remain in human-readable from throughout the entire transmission process, so long as it is ultimately to be presented in human-readable form.

For the purposes of this disclosure, message content is the part of a message that carries the information to be communicated. For example, employee 314 may wish to communicate the message "Please send more syrup for the soda machine." This message content may be embedded in an electronic message that includes other data such as a header, addressing information, time and date information, or other data that might be included in a complete message. The forwarding of message content may include reformatting a message or generating a new electronic message having a different header, addressing information, date and time information, or other data than were included in the received electronic message. Alternatively, the forwarded message may be in the same format as the received message.

The indication that the message content is to be forwarded may be provided in any suitable way. For example, if communication channel 305 is also used to carry transaction authorization requests from payment terminal 307 to host computer 301, the electronic message could include one or more leading characters that signal to host computer 301 that this is a message for forwarding, and not a transaction approval request. Or host computer 301 may recognize that the electronic message includes an indication of its destination. Many other techniques are possible.

Host computer system 301 receives the electronic message, and obtains an indication of the external destination to which the message content is to be forwarded. Host computer system 301 then generates a second electronic message including the message content, for presentation in a human-readable form compatible with the indicated destination, and forwards the second electronic message over a second communication channel via interface 306. For example, host computer system 301 may send an SMS or text message including the message content over a wireless telephone link 318 to a cellular telephone 321 belonging to person 313. Or host computer system 301 could send an electronic mail message over connection 316 and via the Internet to a computer 322 used by person 313. Or host computer system 301 may serve an Internet web page including the message content to an Internet address of computer 322. Thus, the message entered by employee 314 is delivered to a destination accessible by person 313, who can then take the appropriate action. One of skill in the art will recognize that the communication channel represented by wireless telephone link 318 and Internet connection 316 are greatly simplified. Each of these may include various wired and wireless links, computer systems, routers, switches, and other components.

As part of its operation, host computer system 301 obtains an indication of the destination for the second electronic message. This may be accomplished in any suitable way. For example, the first electronic message, sent from payment terminal 307 to host computer system 301, may include a mobile telephone number, an electronic mail address, or some other direct indication of the destination of the message. In this arrangement, host computer 301 extracts the indication from the first electronic message. In another method, host computer system 301 may maintain a preconfigured database of destination indications, and may access the indication from the database based on an identification of the terminal from which the first electronic message is received. In another method, the first electronic message sent from payment terminal 307 to host computer system 301 may include an indirect indication of the message destination. For example, host computer system 301 may maintain a database of destinations, which may include multiple possible destinations for messages received from payment terminal 307. The first electronic message may include an index value indicating which of the possible destinations the message content is to be forwarded to, and host computer system may access an address from the database for forwarding the second electronic message.

In some embodiments, the entity that operates host computer system 301 or another entity may offer support and maintenance services for the payment terminals, and may also be a destination for a message sent from a payment terminal. For example, a terminal operator may note that the payment terminal is low on paper for printing receipts, and may send a message such as "Please send more receipt paper" to a payment terminal support/service provider 323, alerting the support service to the situation. For the purposes of this disclosure, terminal support/service provider 323 is considered to be outside the financial infrastructure, even if it is operated by the same entity that operates host computer system 301.

Figure 4:
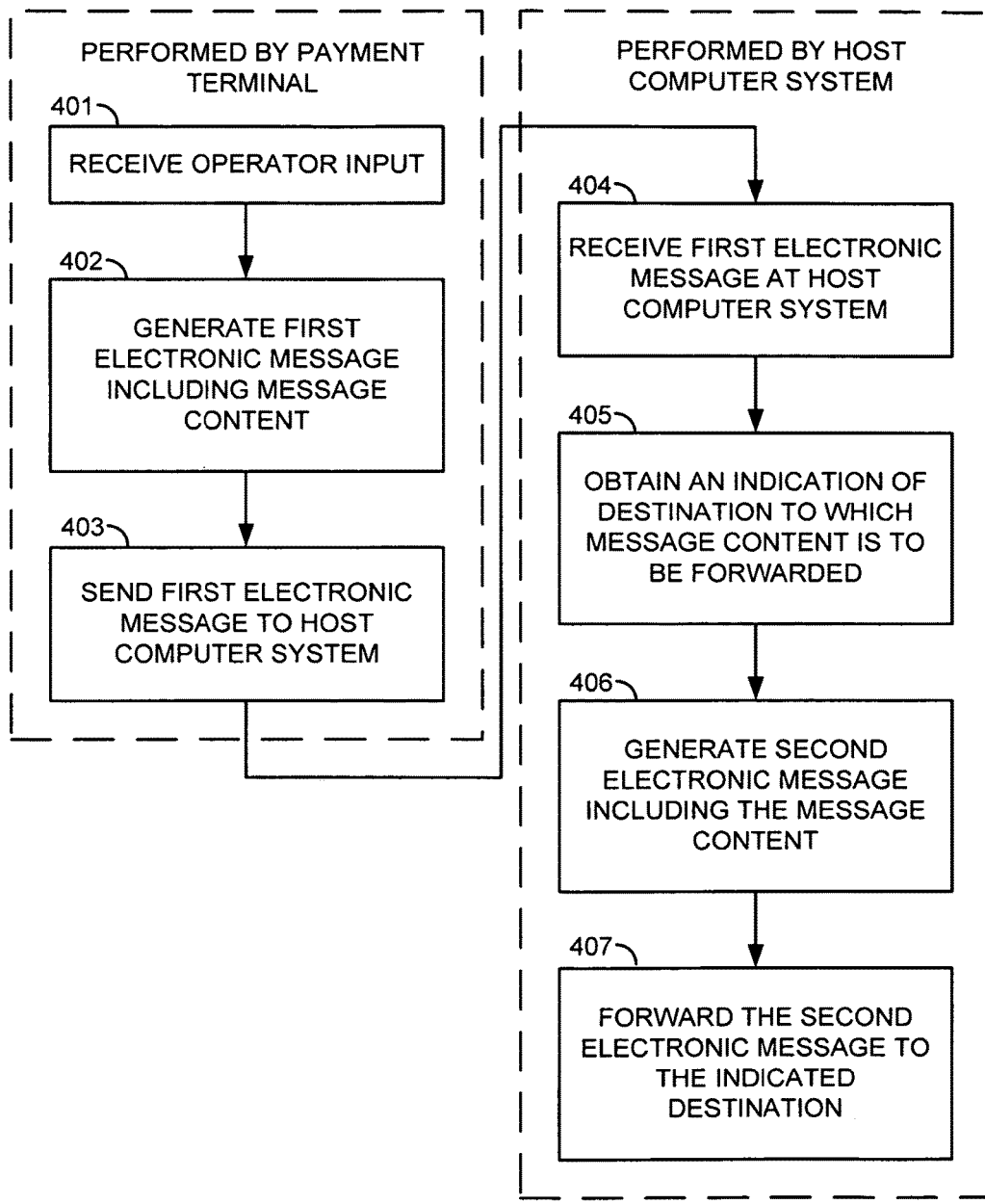
FIG. 4 illustrates a method in accordance with embodiments of the invention, for operator-initiated messages from a payment terminal.

FIG. 4 illustrates a method in accordance with embodiments of the invention, for operator-initiated messages from a payment terminal. In step 401, the payment terminal receives operator input, for example from a keypad, keyboard, touchscreen, or other input device. In step 402, the payment terminal generates a first electronic message including message content, for example the operator input received in step 401. In step 403, the payment terminal sends the first electronic message to the host computer system 301. In step 404, the host computer system receives the first electronic message. In step 405, the host computer system obtains an indication of the destination to which the message content is to be forwarded. In step 406, the host computer system generates a second electronic message including the message content, and in step 407, the host computer system forwards the second electronic message to the indicated destination.

Operator-initiated messages may be used for other purposes as well. For example, an employee may initiate a message upon arriving for work at the beginning of a day or shift to indicate that he or she has arrived on time and that the store location is open for business. A similar message could be sent at closing time or a shift change. In this scenario, the payment terminal messaging capability may serve as a time clock, with employees recording their arrival and departure times via a payment terminal.

Preferably, a payment terminal in accordance with embodiments of the invention is configured to present a user interface to its operator to enable the operator to initiate messages and to enter message content. For example, a particular key press or sequence of key presses may cause a user interface similar to that shown in FIG. 4A to be displayed on a display such as display 203. The operator may then use a keypad such as keypad 204 or another input device to enter an indication of the destination of the message, message content, or other data. Many other features could be programmed into the payment terminal, such as the ability to store multiple message destinations for selection by the operator, and other features.

Messages Between Payment Terminals

In other embodiments, operator-initiated messages can be sent between payment terminals, for example using an emulated SMS or similar capability. The steps involved in sending such a message are similar to those shown in FIG. 4, but in these embodiments, at least one destination for a message sent from a payment terminal is another associated payment terminal.

FIG. 4B illustrates a payment terminal user interface, including display 203 and keypad 204, being used to send a message to both an external address (indicated by telephone number 555-555-5555), and to another payment terminal, indicated by the code "T3". Of course, any system of codes could be established to identify the payment terminals. Once the operator has entered the message and any desired destinations and has indicated the message is to be sent, the payment terminal for example generates a first electronic message including the message content, and sends the first electronic message to host computer system 301, for example over communication channel 305*b*. Host computer system 301 recognizes that this is a message whose content is to be forwarded, and obtains an indication of the destination or destinations for forwarding the message. For example, the first electronic message may include telephone number 555-555-5555 and code T3, and host computer 301 may simply extract the destination indications from the first electronic message.

Other coding schemes may be used as well. For example, rather than entering a complete telephone number to which an SMS message is to be sent, the operator may enter a shorthand code such as "MGR" to indicate that message is to be sent to the store manager. The payment terminal or host computer system 301 may include a preconfigured database that enables host computer 301 to look up delivery addresses based on such codes.

Host computer system 301 then generates a second electronic message including the message content of the first electronic message, and forwards the second electronic message to the indicated payment terminal or terminals. Broadcast messages are also possible, by entering a destination code interpreted by host computer system 301 as meaning that the content of a particular message should be forwarded to all of the terminals associated with the sending terminal. In the example user interface of FIG. 4B, the terminal operator may enter "T*" as a destination code, the asterisk being recognized as meaning all associated terminals.

FIG. 4C illustrates an example screen of a payment terminal that has received the message depicted in FIG. 4B.

Automatically-Initiated Message

In accordance with other embodiments, payment terminal 308 may automatically initiate sending of an electronic message including message content to be delivered to a destination accessible to person 313. The handling of this kind of message by host computer system 301 is similar to the handling of an employee-initiated message as described above. Payment terminal 308 may be configured to generate and send messages at certain times or upon the occurrence of certain events. For example, payment terminal 308 may send a message intended for person 313 every time a payment authorization request is made by payment terminal 308. Such a message could include simply the fact that a transaction is in progress, or could also include information about the transaction, such as the transaction amount. Or payment terminal 308 may send a message at the time payment terminal batches out, and the message may include information similar to the batch out information. Many other triggering events are possible. For example, payment terminal 308 may send a message for person 313 whenever a transaction is processed that exceeds a predetermined monetary threshold amount, when the aggregate amount of the transactions processed for the day have reached a threshold amount, when a predetermined number of transactions has been reached for the day, or upon the occurrence of some other event. Messages could be sent on a predetermined time schedule, or a message could be sent if no transactions have been processed for a predetermined length of time.

In other embodiments, the payment terminal may report information relating to its own operation. For example, payment terminal 308 may initiate a message to indicate that some fault has occurred, or that it is about to run out of paper for printing receipts or some other supply item. Payment terminal 308 could also report the amount of a supply item that has been consumed or remains in the payment terminal. Such messages could be sent to an owner or manager, to payment terminal support/service provider 323, or another appropriate recipient.

Some payment terminals have the ability to download firmware updates for correcting programming problems or implementing new features. A payment terminal in accordance with an embodiment of the invention may initiate an electronic message to alert a store owner or manager that such an update has occurred.

Figure 5:
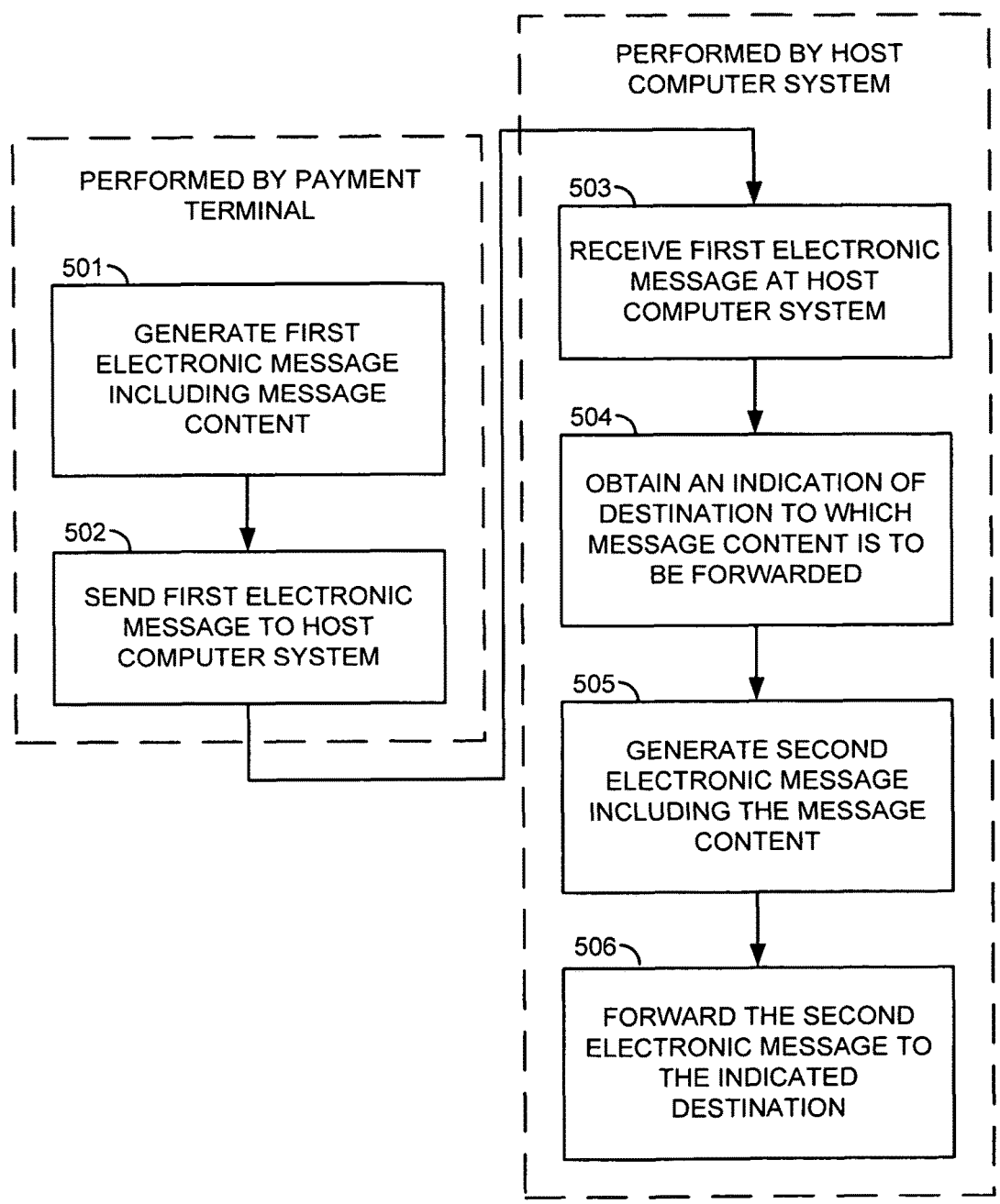
FIG. 5 illustrates a method in accordance with embodiments of the invention, for automatically-initiated messages from a payment terminal to an external destination.

FIG. 5 illustrates a method in accordance with embodiments of the invention, for automatically-initiated messages from a payment terminal to an external destination. In step 501, the payment terminal generates a first electronic message including message content, for example data stored in the payment terminal. In step 502, the payment terminal sends the first electronic message to the host computer system 301. In step 503, the host computer system receives the first electronic message. In step 504, the host computer system obtains an indication of the destination to which the message content is to be forwarded. In step 505, the host computer system generates a second electronic message including the message content, and in step 506, the host computer system forwards the second electronic message to the indicated destination.

Externally-Initiated Message

In accordance with other embodiments, person 313 may initiate and send messages to a particular payment terminal. For example, person 313 may wish to direct a message to employee 315, the operator of payment terminal 308. In this scenario, person 313 sends a first electronic message, including message content, to host computer system 301 from a source outside the financial infrastructure over a first communication channel. For example, person 313 may send an SMS or text message from cellular telephone 321 over wireless telephone link 318, or an electronic mail message from computer 322 over Internet connection 316. Each payment terminal has a unique identifier so that host computer system 301 can uniquely address each payment terminal. Host computer system 301 obtains an identification of the payment terminal to which the message content is to be forwarded, generates a second electronic message including the message content, and forwards the second electronic message to the appropriate payment terminal (308 in this example) over a second communication channel, such as channel 305b. Once the second electronic message is received at payment terminal 308, it may be displayed on display 312.

Many variations are possible on this basic process. For example, if communication channel 305b is a dial-up connection that is also used to carry transaction authorization requests between payment terminal 308 and host computer system 301, payment terminal 308 may disconnect from host computer system 301 after each transaction authorization request. In that case, the second electronic message may not be immediately delivered to payment terminal 308 (and operator 315), but may be held in memory 303 of host computer system 301 until payment terminal 308 next makes contact with host computer system 301, and forwarded then.

As part of the process of forwarding a message to one of the payment terminals, host computer system 301 obtains an identification of the terminal to which the message is to be delivered. This may be accomplished in any suitable way. For example, the first electronic message, received from the external source, may include the identification, and host computer system 301 may simply extract the identification from the first electronic message. The identification enables host computer system 301 to direct the second electronic message to the appropriate payment terminal.

In another technique, the first electronic message includes an indication of its source. For example, if the first electronic message is sent from cellular telephone 321, the message may include the telephone number of cellular telephone 321. Or if the first electronic message is sent from computer 322, the message may include an electronic mail address or an Internet address of computer 322. Memory 303 of host computer system 301 may maintain a previously configured database correlating message source indications with addresses of particular payment terminals. For example, the database may indicate that any first electronic message originating from a particular mobile telephone number is to be forwarded to a particular payment terminal. In that case, whenever a first electronic message arrives from that telephone number, host computer system 301 accesses the payment terminal address from the database, and forwards the second electronic message to that address.

When a particular person 313 wishes to individually access multiple payment terminals, the indication of which terminal a particular message is directed to may be included in the first electronic message. Alternatively, the first electronic message may include an indication that its message content is to be delivered to more than one or even all of the payment terminals that the source is associated with in the database. In this scenario, person 313 may send messages to be "broadcast" to a number of payment terminals.

Figure 6:
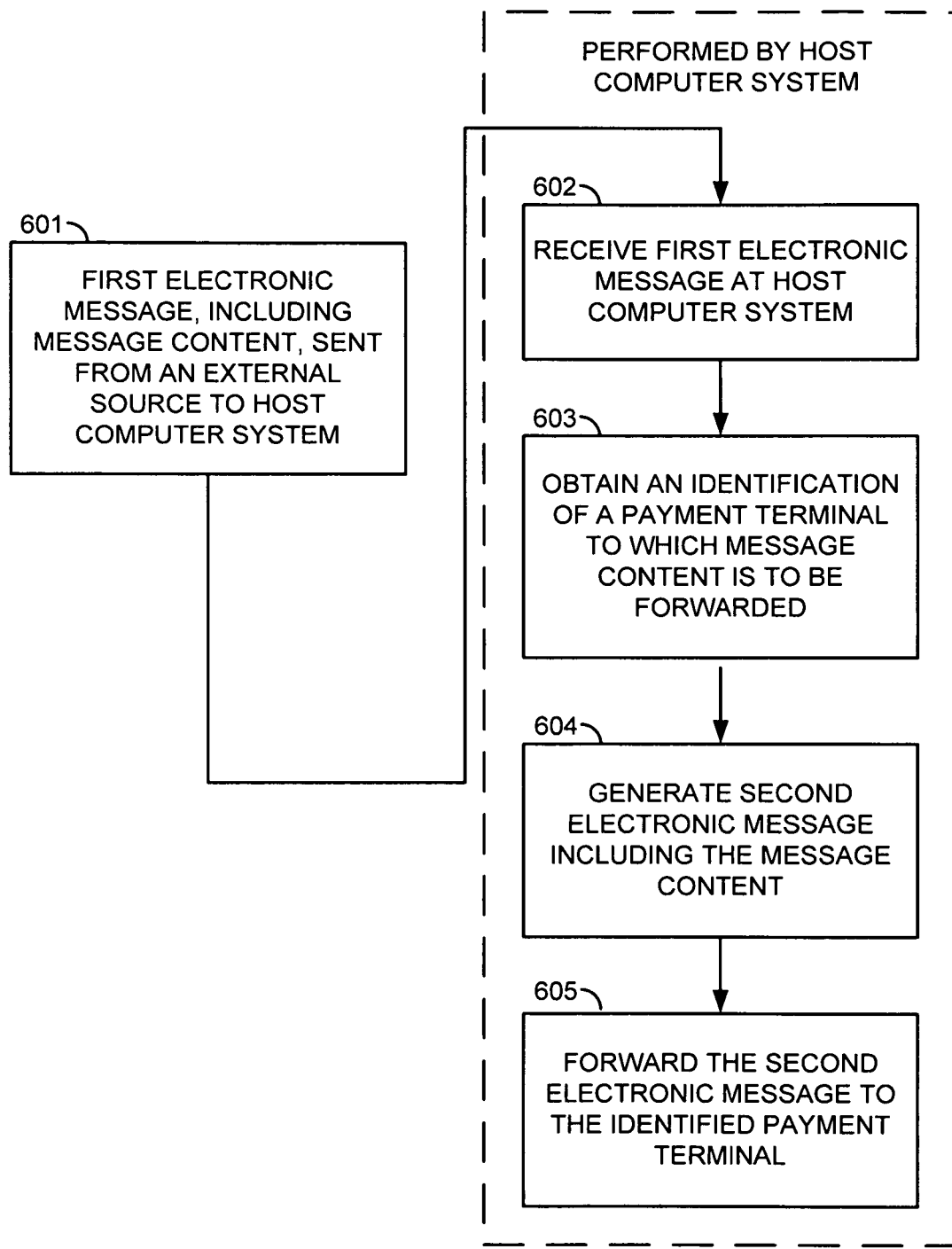
FIG. 6 illustrates a method in accordance with embodiments of the invention, for handling externally-initiated messages.

FIG. 6 illustrates a method in accordance with embodiments of the invention, for handling externally-initiated messages. In step 601, a first electronic message including message content is sent from an external source to host computer system 301. In step 602, host computer system 301 receives the first electronic message. In step 603, host computer system 303 obtains an identification of a payment terminal to which the message content is to be forwarded. In step 604, host computer system 301 generates a second electronic message that includes the message content. In step 605, host computer system sends the second electronic message to the identified payment terminal.

For externally initiated messages, it is contemplated that existing standard messaging devices may be used to send messages to be forwarded to the payment terminals. For example, mobile phone 321 may have SMS or texting capability as a standard feature, and may be configured to store a telephone number for accessing host computer 301. To initiate a message, person 313 may need only text a message to the telephone number. For example person 313 may text the message "T2 PLS CALL TO DISCUSS SYRUP SUPPLY" to host computer 301, indicating that the message content "PLS CALL TO DISCUSS SYRUP SUPPLY" is to be forward to the second payment terminal (T2, payment terminal 308) associated with the telephone number of person 313 from which the message is being sent.

Similarly, if person 313 is using computer 322 to send messages whose content is to be forwarded to the payment terminals, a standard email program or web browser may be used. Of course, it is also contemplated that custom software applications could be installed on devices such as mobile phone 321 or computer 322, for example to manage terminal identifiers, allow selection of canned messages, and the like.

Externally-Initiated Information Request

In other embodiments, person 313 may initiate a set of messages that requests and obtains information from one of payment terminals 307 or 308. For example, if person 313 is a business owner or manager, he or she may wish to get an update on how business is progressing at a particular store location. This process involves two different message sets—one initiated externally by person 313, and one sent by the particular payment terminal in response. The message sets are similar to those described above.

The data stored in the payment terminal in anticipation of the batching out process may provide useful information to the owner or manager. In accordance with embodiments of the invention, person 313 can initiate a request that a particular payment terminal return information such as some or all of the transaction data stored in the payment terminal, or information derivable from the stored data. For example, the payment terminal may return the total number of transactions performed using the payment terminal in a certain time period, such as a particular day, a particular shift, or since the last request for information. Or the payment terminal may return the total monetary amount of the transactions performed using the payment terminal in a certain time period. Or the payment terminal may return an average monetary amount of the transactions performed using the payment terminal in a certain time period. Or the payment terminal may return the monetary amount of the most recent transaction conducted using the payment terminal. In some embodiments, the returned information is forwarded to the source of the electronic message that requested the information, but this is not a requirement. For example, person 313 could use computer 322 to make a request for information from a payment terminal, using a web interface served over the Internet by host computer 301, but could specify that the resulting message carrying the requested information be sent via SMS message to his or her mobile phone 321.

In some embodiments, person 313 may request information that is indicative of employee behavior. For example, person 313 may request and a payment terminal may return the time of day of the first transaction performed using the payment terminal on a certain day, which indicates that an employee arrived at work at least by that time. Similarly, person 313 could request the time of the last transaction performed on a certain day, which indicates that an employee remained at the store location at least until that time.

As in the example described above of an externally-initiated message, host computer system 301 may not be able to contact the payment terminal immediately, but may wait until the payment terminal next makes contact with host computer system 301 before sending a message to the payment terminal.

Figure 7:
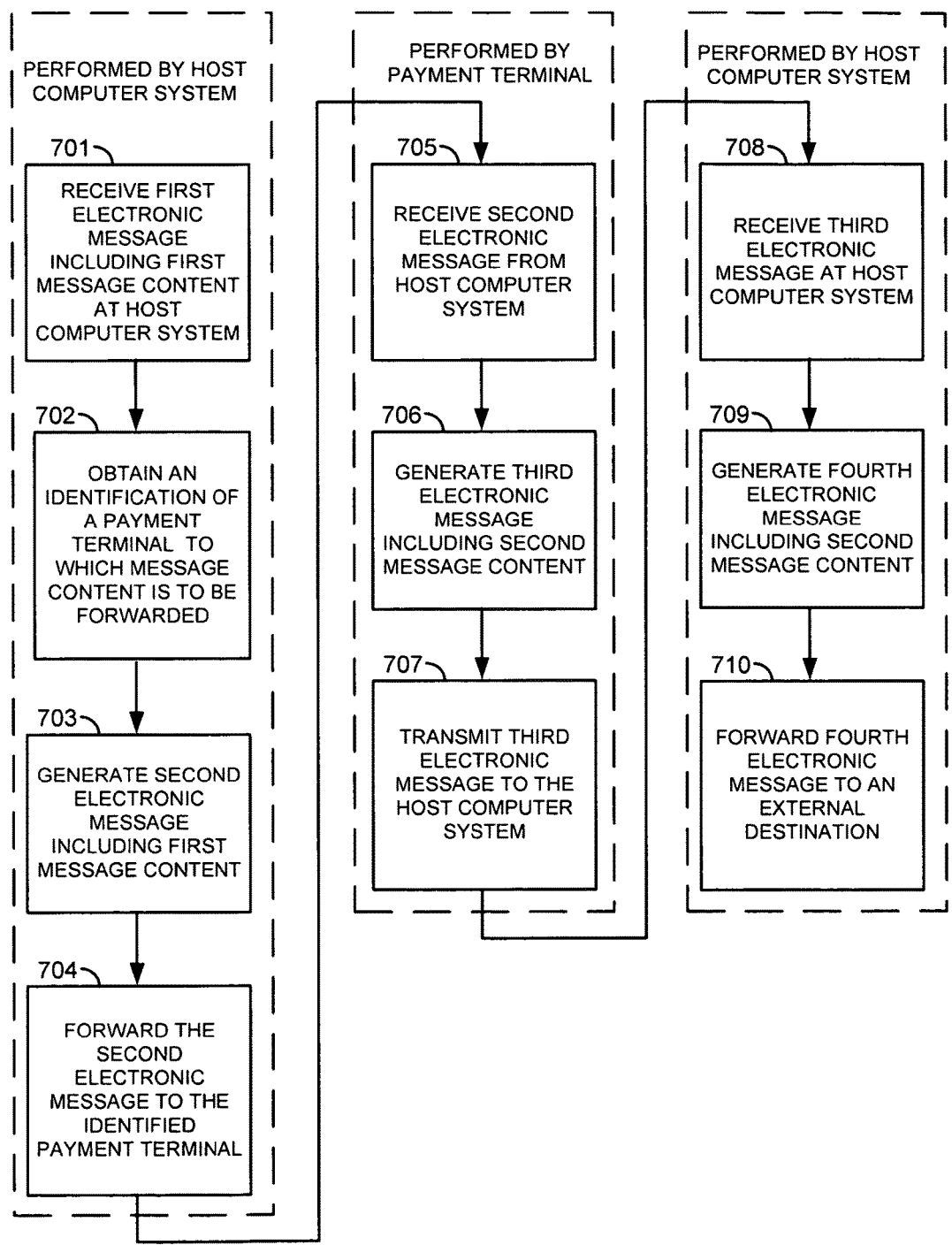
FIG. 7 illustrates methods, cooperatively performed by a host computer system and a payment terminal, in accordance with embodiments of the invention.

FIG. 7 illustrates methods, cooperatively performed by host computer system 301 and one of payment terminals 307, 308, in accordance with embodiments of the invention. At step 701, host computer system 301 receives a first electronic message from a person such as person 313 at a source outside the financial infrastructure. The first electronic message includes first message content. In step 702, host computer system obtains an identification of a payment terminal to which the first message content is to be forwarded. In step 703, host computer system 301 generates a second electronic message including the first message content. In step 704, the host computer system forwards the second electronic message to the identified payment terminal. In step 705, the payment terminal receives the second electronic message from host computer system 301. In step 706, the payment terminal generates a third electronic message including second message content. In step 707, the payment terminal forwards the third electronic message to host computer system 301. In step 708, host computer system 301 receives the third electronic message. In step 709, host computer system 301 generates a fourth electronic message including the second message content. In step 710, host computer system 301 forwards the fourth electronic message to a destination outside the financial infrastructure.

Security

All messages and transmissions handled by the system preferably conform to industry standards governing how information can be handled and communicated, for example the Payment Card Industry Data Security Standards, PCI-DSS. Either the payment terminals, host computer system 301, or both may include programming for compliance with the applicable industry and regulatory standards. For example, to the extent certain information could not be distributed through an automated means from the terminal to an external destination, host computer system 301 may be programmed to safeguard that information. In some embodiments, messages between host computer system 301 and the external source may be encoded or encrypted using any suitable algorithm or method to reduce the likelihood that an eavesdropper on the communications could learn the content of the messages. Similarly, messages between host computer system 301 and payment terminals 307 and 307 could be encoded or encrypted for secrecy.

In some embodiments, security measures may be implemented to prevent unauthorized use of the system. For example, payment terminals 307, 308 may be configured to be able to send messages to only certain destinations. In one example embodiment, emulated text messaging from a payment terminal may be restricted to only the mobile phone number of a store owner or manager, so that employees cannot use the payment terminal for social messaging outside the scope of their work. Similar restrictions may be placed on other messaging methods, for example a payment terminal that can cause electronic mail messages to be sent to external destinations may be limited to communicating with only certain previously specified destinations. These kinds of restrictions may be implemented in the payment terminal itself, or may preferably be implemented in host computer system 301. For example, host computer system 301 may maintain a database of one or more authorized mobile phone numbers or electronic mail addresses to which messages may be forwarded, and may refuse to forward any messages to having unauthorized destination indications.

Similarly, security measures may be implemented to prevent illicit access to transaction data stored in the payment terminals. In a basic form of security, host computer system 301 may maintain a database associating an external message source, such as a mobile telephone number, electronic mail address, or Internet address, with certain payment terminals, and may refuse to forward requests for information from any source not in the database or not directed to a payment terminal associated with the source.

In another embodiment, a password scheme may be implemented, such that a predetermined password or other authentication code must be correctly supplied by any requestor before any requested data will be returned to the requester. While a password or authentication code may be required for any kind of requesting message, for example an SMS or text message may include an embedded password or other access code, a password scheme may be especially useful when person 313 interacts with host computer system 301 via a web interface served over the Internet. In this scenario, a business owner or manager may set up an account with the operator of host computer system 301. In this context, an "account" is a working relationship with the operator of host computer system 301 and the associated databases and other information stored on host computer system 301 to provide messaging services using payment terminals. Once an account is established, the business owner or manager may use a web interface served from host computer system 301 to identify one or more destination addresses such as mobile telephone numbers or electronic mail addresses with which external messages may be exchanged, identify persons having authorization to access the system, manage login names and passwords for the authorized persons, and the like. The business owner or manager preferably works with the operator of host computer system 301 to identify which payment terminals are to be accessible, and to associate them with the account. Of course, host computer system 301 may handle payment terminal messaging for many different businesses and store data relating to many different accounts.

Once an authorized such as person 313 user is logged in, he or she may be presented with an interface such as example interface 800 shown in FIG. 8. In this example, host computer system has been previously loaded with information about the payment terminals the authorized person is associated with and can therefore access, and what external destinations message content may be forwarded to. Interface 800 is served by host computer 301 to a computer such as computer 322 for use by person 313. Example interface 800 enables the user to send messages to one or more terminals, request data from at least one terminal, specify which terminal or terminals are to be accessed, select which data is to be retrieved from a selected terminal, and specify how and where any returned message content is to be delivered. Not all of these features need be provided, and other features may be provided, in any suitable combination. Once an interaction with one or more payment terminals is specified, the user can click the SUBMIT selection 801 to initiate the interaction. The resulting recognition of the information specified by the user by host computer system 301 is considered a first electronic message, whether the information from interface 800 is transmitted to host computer system 301 at once or piecemeal as it is entered into interface 800.

The invention has now been described in detail for the purposes of clarity and understanding. However, those skilled in the art will appreciate that certain changes and modifications may be practiced within the scope of the appended claims.

What is claimed is:

1. A method of providing human-readable information from a payment terminal to a person away from the payment terminal and at a destination external to a financial infrastructure, the financial infrastructure for processing financial transactions at the payment terminal, the method comprising:
receiving, by a host computer system, from the payment terminal, over a first communication channel used for processing financial transactions, a first electronic message including message content and an indication that the message content is to be forwarded in human-readable form to a person not conducting a financial transaction at the payment terminal;
obtaining, by the host computer system, destination information identifying an external destination to which the message content is to be forwarded;
generating, by the host computer system, a second electronic message including the message content for presentation in a human-readable form compatible with the external destination; and
forwarding, by the host computer system and based on the destination information, the second electronic message, including the message content, to the external destination over a second communication channel via an external interface included in the host computer system.

2. The method of claim 1, wherein forwarding the second electronic message comprises sending a short message service message including the message content.

3. The method of claim 1, wherein forwarding the second electronic message comprises sending an electronic mail message including the message content.

4. The method of claim 1, wherein forwarding the second electronic message comprises serving a web page containing the message content.

5. The method of claim 1, wherein the first communication channel also carries transaction approval requests from the payment terminal to the host computer system.

6. The method of claim 1, wherein forwarding the second electronic message comprises forwarding the second electronic message to an entity that provides support or maintenance services for the payment terminal.

7. The method of claim 1, wherein the second communications channel comprises a connection to the Internet.

8. The method of claim 1, wherein the second communications channel comprises a connection to a mobile telephone network.

9. A host computer system, comprising:
a processor;
a memory; and
interfaces to first and second communication channels;
wherein the memory contains instructions that when executed by the processor cause the host computer system to
receive, from a payment terminal, over the first communication channel, a first electronic message including message content and an indication that the message content is to be forwarded in human-readable form to a person not conducting a financial transaction at the payment terminal, the person located away from the payment terminal and at a destination external to a financial infrastructure, the financial infrastructure for processing financial transactions at the payment terminal;
obtain destination information identifying the external destination outside of a financial infrastructure to which the message content is to be forwarded;
generate a second electronic message including the message content for presentation in a human-readable form compatible with the external destination; and
forward the second message, including the message content, to the indicated destination over the second communication channel and based on the destination information.

10. The host computer system of claim 9, wherein the instructions, when executed by the processor, further cause the host computer system to send, as the second electronic message, a short message service message including the message content.

11. The host computer system of claim 9, wherein the instructions, when executed by the processor, further cause the host computer system to send, as the second electronic message, an electronic mail message including the message content.

12. The host computer system of claim 9, wherein the instructions, when executed by the processor, further cause the host computer system to serve a web page containing the message content.

13. The host computer system of claim 9, wherein the first communication channel also carries transaction approval requests from the payment terminal to the host computer system.

14. The host computer system of claim 9, wherein the second electronic message is forwarded to an entity that provides support or maintenance services for the payment terminal.

15. A method of providing human-readable information from a payment terminal to a person away from the payment terminal and at a destination external to a financial infrastructure, the financial infrastructure for processing financial transactions at the payment terminal, the method comprising:
receiving, by a host computer system, from the payment terminal, over a first communication channel used for processing financial transactions, a first electronic message including message content and an indication that the message content is to be forwarded in human-readable form to a person not conducting a financial transaction at the payment terminal;
obtaining, by the host computer system, an indication of an external destination to which the message content is to be forwarded;
generating, by the host computer system, a second electronic message including the message content for presentation in a human-readable form compatible with the external destination; and
forwarding, by the host computer system and based on the indication of an external destination, the second electronic message, including the message content, to the external destination over a second communication channel via an external interface included in the host computer system.

16. The system of claim 15, wherein the indication of an external destination comprises a mobile telephone number or an email address.

17. The system of claim 15, wherein the indication that the message content is to be forwarded comprises an indication of a message destination in the first electronic message, and wherein obtaining, by the host computer system, an indication of an external destination further comprises:
  extracting from the first electronic message, by the host computer, the indication of an external destination.

18. The system of claim 15, wherein the host computer system maintains a database of destination indications, and wherein obtaining, by the host computer system, an indication of an external destination to which the message content is to be forwarded comprises:
  accessing, by the host computer, the database based on an identification of the payment terminal.

19. The system of claim 15, wherein the host computer maintains a database of destination addresses, wherein the first electronic message includes an index value indicating the external destination, and wherein the host computer accesses the database based on the index value.

\* \* \* \* \*